(12) United States Patent
Chen et al.

(10) Patent No.: US 10,887,910 B2
(45) Date of Patent: Jan. 5, 2021

(54) METHOD AND APPARATUS OF NEW RADIO V2X CLUSTER MANAGEMENT

(71) Applicant: MediaTek Inc., Hsinchu (TW)

(72) Inventors: Ju-Ya Chen, Hsinchu (TW); Chien-Yi Wang, Hsinchu (TW); Ahmet Umut Ugurlu, Cambridge (GB)

(73) Assignee: MediaTek Inc. (TW)

( * ) Notice: Subject to any disclaimer, the term of this patent is extended or adjusted under 35 U.S.C. 154(b) by 0 days.

(21) Appl. No.: 16/671,179

(22) Filed: Nov. 1, 2019

(65) Prior Publication Data

US 2020/0107354 A1 Apr. 2, 2020

Related U.S. Application Data

(63) Continuation-in-part of application No. 16/584,943, filed on Sep. 27, 2019.
(Continued)

(51) Int. Cl.
*H04W 72/12* (2009.01)
*H04W 72/02* (2009.01)
(Continued)

(52) U.S. Cl.
CPC ...... *H04W 72/1289* (2013.01); *H04B 17/327* (2015.01); *H04W 4/023* (2013.01);
(Continued)

(58) Field of Classification Search
CPC ........... H04W 4/40; H04W 4/46; H04W 4/44; H04W 4/42; H04W 72/0446; H04W 72/0453
See application file for complete search history.

(56) References Cited

U.S. PATENT DOCUMENTS

2007/0027610 A1* 2/2007 Parikh ............... G08G 1/0104
  701/117
2013/0250771 A1* 9/2013 Yu ..................... H04W 76/14
  370/241
(Continued)

FOREIGN PATENT DOCUMENTS

EP           3316658 A1 *  5/2018  ............ H04W 84/18
KR     20140054673 A     6/2014

OTHER PUBLICATIONS

China National Intellectual Property Administration, International Search Report and Written Opinion for PCT/CN2019/115053, dated Jan. 14, 2020.
(Continued)

*Primary Examiner* — Devan A Sandiford
(74) *Attorney, Agent, or Firm* — Han IP PLLC; Andy M. Han

(57) ABSTRACT

Various examples and schemes pertaining to New Radio (NR) vehicle-to-everything (V2X) cluster management are described. An apparatus, implemented in a user equipment (UE) of a V2X cluster in an NR V2X communication environment, receives a scheduling request from a member of the V2X cluster. The apparatus transmits a resource grant to the member to allocate a resource of one or more resources to the member responsive to the receiving of the scheduling request. The one or more resources are either: (a) preconfigured by a wireless network, or (b) granted by the wireless network responsive to the UE transmitting a resource request to the wireless network upon receiving the scheduling request.

20 Claims, 7 Drawing Sheets

Related U.S. Application Data

(60) Provisional application No. 62/738,026, filed on Sep. 28, 2018, provisional application No. 62/754,703, filed on Nov. 2, 2018.

(51) Int. Cl.
  *H04W 28/02* (2009.01)
  *H04W 28/26* (2009.01)
  *H04W 4/02* (2018.01)
  *H04W 4/40* (2018.01)
  *H04B 17/327* (2015.01)

(52) U.S. Cl.
  CPC ............ *H04W 4/027* (2013.01); *H04W 4/40* (2018.02); *H04W 28/0278* (2013.01); *H04W 28/26* (2013.01); *H04W 72/02* (2013.01)

(56) References Cited

U.S. PATENT DOCUMENTS

| | | | | |
|---|---|---|---|---|
| 2015/0304902 A1* | 10/2015 | Yu | ............... | H04W 76/14 455/436 |
| 2016/0174205 A1* | 6/2016 | Maaref | ............... | H04W 4/70 370/329 |
| 2019/0141495 A1* | 5/2019 | Jha | ............... | H04W 84/18 |
| 2019/0251848 A1* | 8/2019 | Sivanesan | ............. | H04W 76/27 |
| 2019/0349796 A1* | 11/2019 | Hehn | ............... | H04W 4/70 |
| 2020/0092685 A1* | 3/2020 | Fehrenbach | ........ | H04W 68/005 |

OTHER PUBLICATIONS

Oppo, Discussion of sidelink unicast, groupcast and broadcast for NR-V2X, 3GPP TSG RAN WG1 Meeting #94, R1-1808875, Gothenburg, Sweden, Aug. 20-24, 2018.

Mediatek Inc., On Sidelink Resource Allocation Mechanism, 3GPP TSG RAN WG1 Meeting #95, R1-1812367, Spokane, USA, Nov. 12-16, 2018.

Intel Corporation, Summary for NR-V2X AI-7.2.4.1.4 Resource Allocation Mechanism, 3GPP TSG RAN WG1 Meeting #95, R1-1814260, Spokane, USA, Nov. 12-16, 2018.

Mediatek Inc., UE-assisted resource allocation for NR V2X, 3GPP TSG-RAN WG2 Meeting #103bis, R2-1813673, Chengdu, China, Oct. 8-12, 2018.

\* cited by examiner

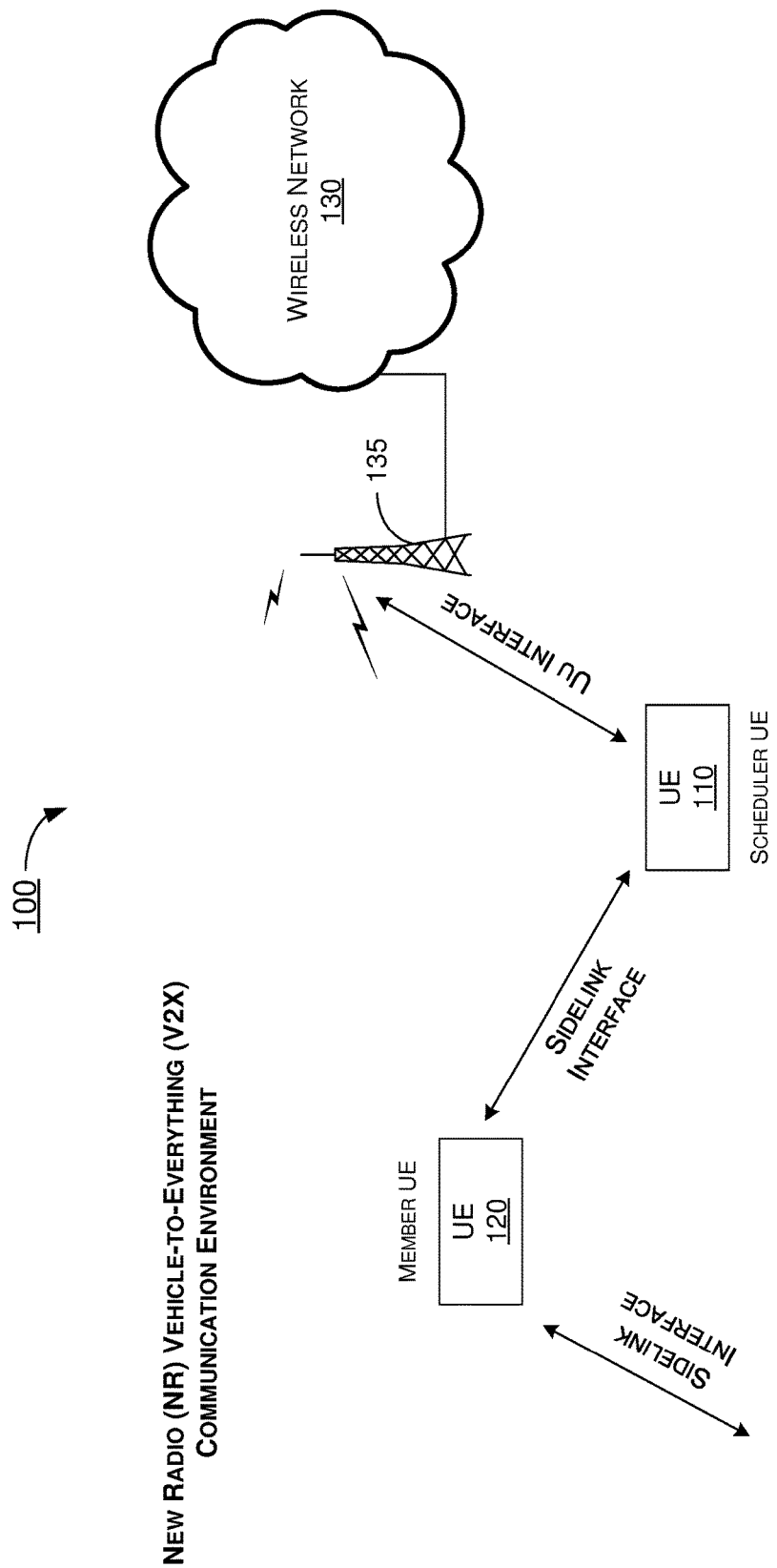

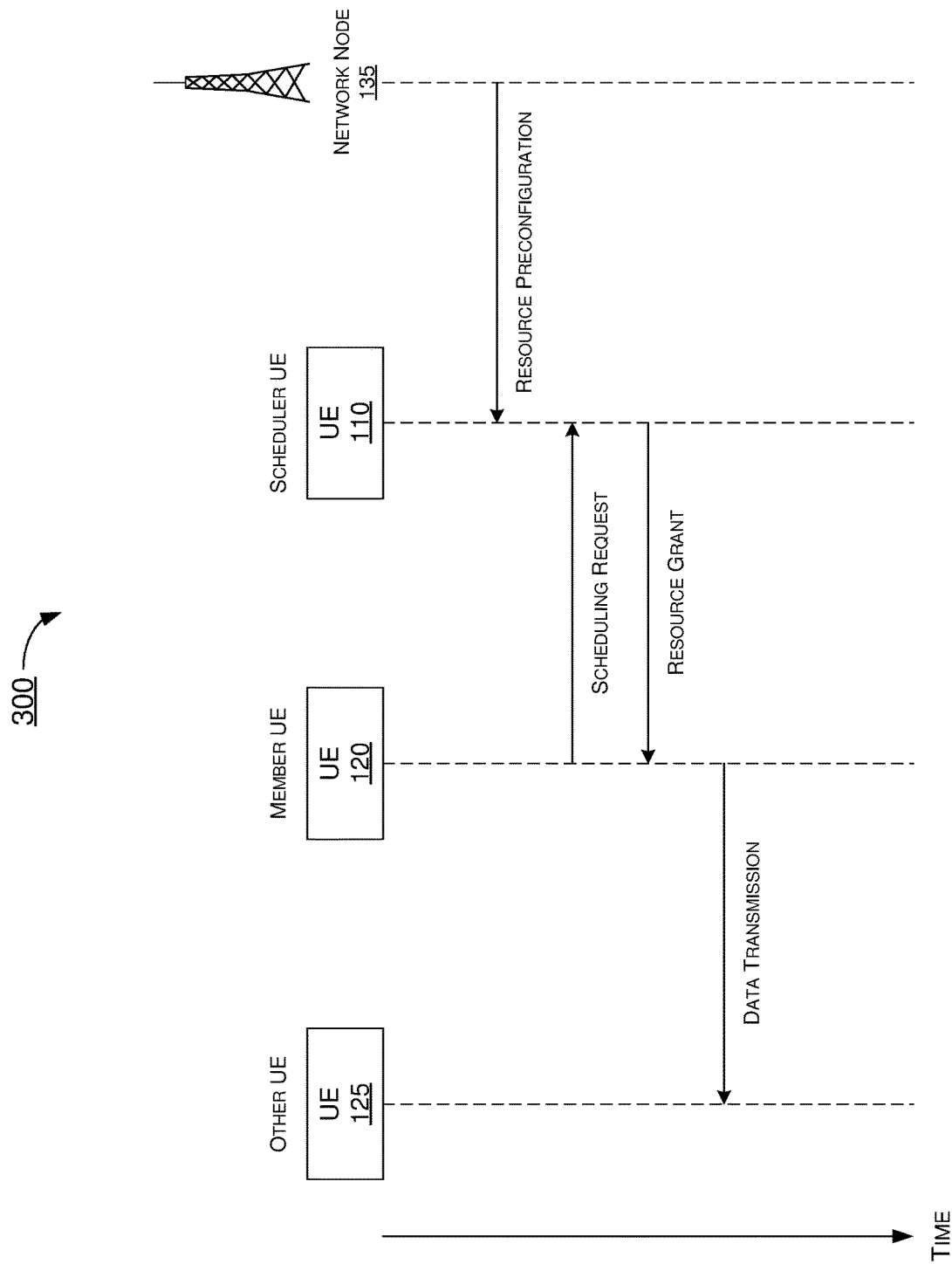

500

```
┌─────────────────────────────────────────────┐
│ RECEIVE, BY A PROCESSOR OF AN APPARATUS     │
│ IMPLEMENTED IN A USER EQUIPMENT (UE) OF A   │
│ VEHICLE-TO-EVERYTHING (V2X) CLUSTER IN A    │
│ NEW RADIO (NR) V2X COMMUNICATION            │
│ ENVIRONMENT, A SCHEDULING REQUEST FROM A    │
│ MEMBER OF THE V2X CLUSTER                   │
│                  510                        │
└─────────────────────────────────────────────┘
                      │
                      ▼
┌─────────────────────────────────────────────┐
│ TRANSMIT, BY THE PROCESSOR, A RESOURCE      │
│ GRANT TO THE MEMBER TO ALLOCATE A RESOURCE  │
│ OF ONE OR MORE RESOURCES TO THE MEMBER      │
│ RESPONSIVE TO THE RECEIVING OF THE          │
│ SCHEDULING REQUEST, WITH THE ONE OR MORE    │
│ RESOURCES BEING EITHER: (A) PRECONFIGURED   │
│ BY A WIRELESS NETWORK; OR (B) GRANTED BY    │
│ THE WIRELESS NETWORK RESPONSIVE TO THE UE   │
│ TRANSMITTING A RESOURCE REQUEST TO THE      │
│ WIRELESS NETWORK UPON RECEIVING THE         │
│ SCHEDULING REQUEST                          │
│                  520                        │
└─────────────────────────────────────────────┘
```

FIG. 5

METHOD AND APPARATUS OF NEW RADIO V2X CLUSTER MANAGEMENT

CROSS REFERENCE TO RELATED PATENT APPLICATION(S)

The present disclosure is part of a non-provisional application which claims the priority benefit of U.S. Patent Application No. 62/754,703, filed on 2 Nov. 2018, and which is also a continuation-in-part (CIP) of U.S. patent application Ser. No. 16/584,943, filed on 27 Sep. 2019, claiming the priority benefit of U.S. Patent Application No. 62/738,026, filed on 28 Sep. 2018. Contents of aforementioned applications are herein incorporated by reference in their entirety.

TECHNICAL FIELD

The present disclosure is generally related to wireless communications and, more particularly, to techniques pertaining to New Radio (NR) vehicle-to-everything (V2X) cluster management.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specifications, vehicle platooning can support reliable vehicle-to-vehicle (V2V) communications between a specific user equipment (UE) supporting V2X applications and up to nineteen other UEs supporting V2X applications. Moreover, under the 3GPP specifications, in NR Sidelink, multiple UEs may be grouped into a cluster with a cluster head (herein interchangeably referred to as a "scheduler UE") scheduling the time-frequency resources for other UEs in the cluster. Scheduling by cluster head is a centralized scheduling scheme, and centralized scheduling tends to be more reliable and more suitable in situations with crowded traffic than distributed scheduling. For centralized scheduling, the cluster head can sense its local environment and, accordingly, schedule available resources faster than a base station (e.g., gNB) can. Currently, certain details regarding V2X cluster management remain to be defined, including: cluster architecture, resource scheduling, selection of a scheduler UE, procedures for member check-in and check-out, cluster head handover to a member, member handover to another cluster, how to handle disappearance of the scheduler UE, and cluster dissolution.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to NR V2X cluster management. Specifically, an objective of the present disclosure is to propose schemes related to cluster architecture, resource scheduling, selection of a scheduler UE, procedures for member check-in and check-out, cluster head handover to a member, member handover to another cluster, how to handle disappearance of the scheduler UE, and cluster dissolution.

In one aspect, a method may involve a processor of an apparatus, implemented in a UE of a V2X cluster in an NR V2X communication environment, receiving a scheduling request from a member of the V2X cluster. The method may also involve the processor transmitting a resource grant to the member to allocate a resource of one or more resources to the member responsive to the receiving of the scheduling request. The one or more resources may be either: (a) preconfigured by a wireless network, or (b) granted by the wireless network responsive to the UE transmitting a resource request to the wireless network upon receiving the scheduling request.

In one aspect, a method may involve a processor of an apparatus, implemented in a UE, detecting a scheduler UE in an NR V2X communication environment. The method may also involve the processor selecting the scheduler UE to join a V2X cluster associated with the scheduler UE in response to the detecting and at least one of the following: (1) a channel occupancy ratio in the NR V2X communication environment being greater than a predefined threshold; (2) the UE having a throughput greater than a predefined throughput; and (3) the UE having data to transmit with a size of the data being greater than a predefined size.

It is noteworthy that, although description provided herein may be in the context of certain radio access technologies, networks and network topologies such as NR V2X and V2V, the proposed concepts, schemes and any variation(s)/derivative(s) thereof may be implemented in, for and by other types of radio access technologies, networks and network topologies such as, for example and without limitation, $5^{th}$ Generation (5G), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram of an example network environment in which various solutions and schemes in accordance with the present disclosure may be implemented.

FIG. 3 is a diagram of an example scenario in accordance with an implementation of the present disclosure.

FIG. 5 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to NR V2X cluster management. According to the present disclosure, a number of possible solutions may be implemented separately or jointly. That is, although these possible solutions may be described below separately, two or more of these possible solutions may be implemented in one combination or another.

Figure 2A:
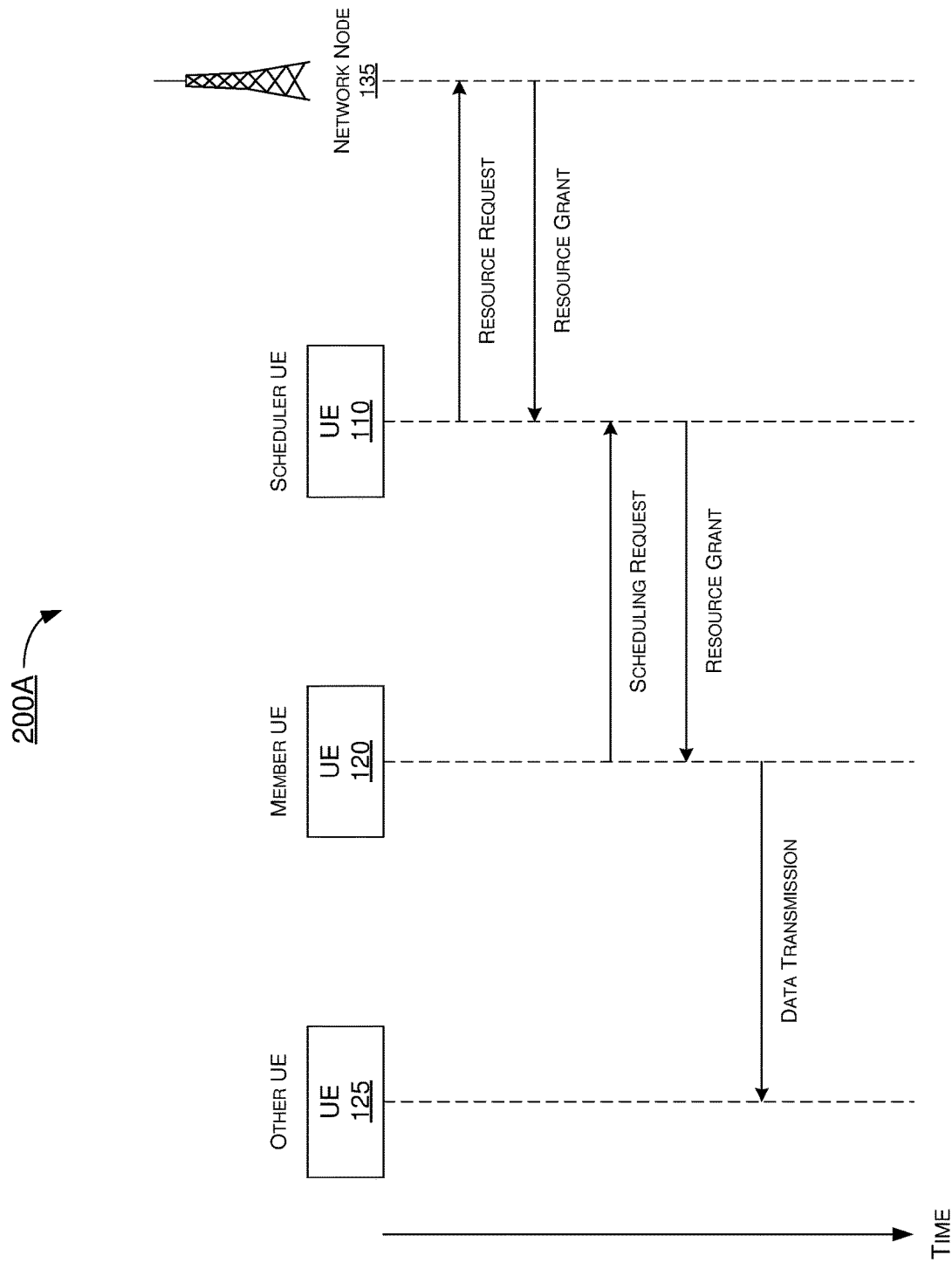
FIG. 2A is a diagram of an example scenario in accordance with an implementation of the present disclosure.
Figure 2B:
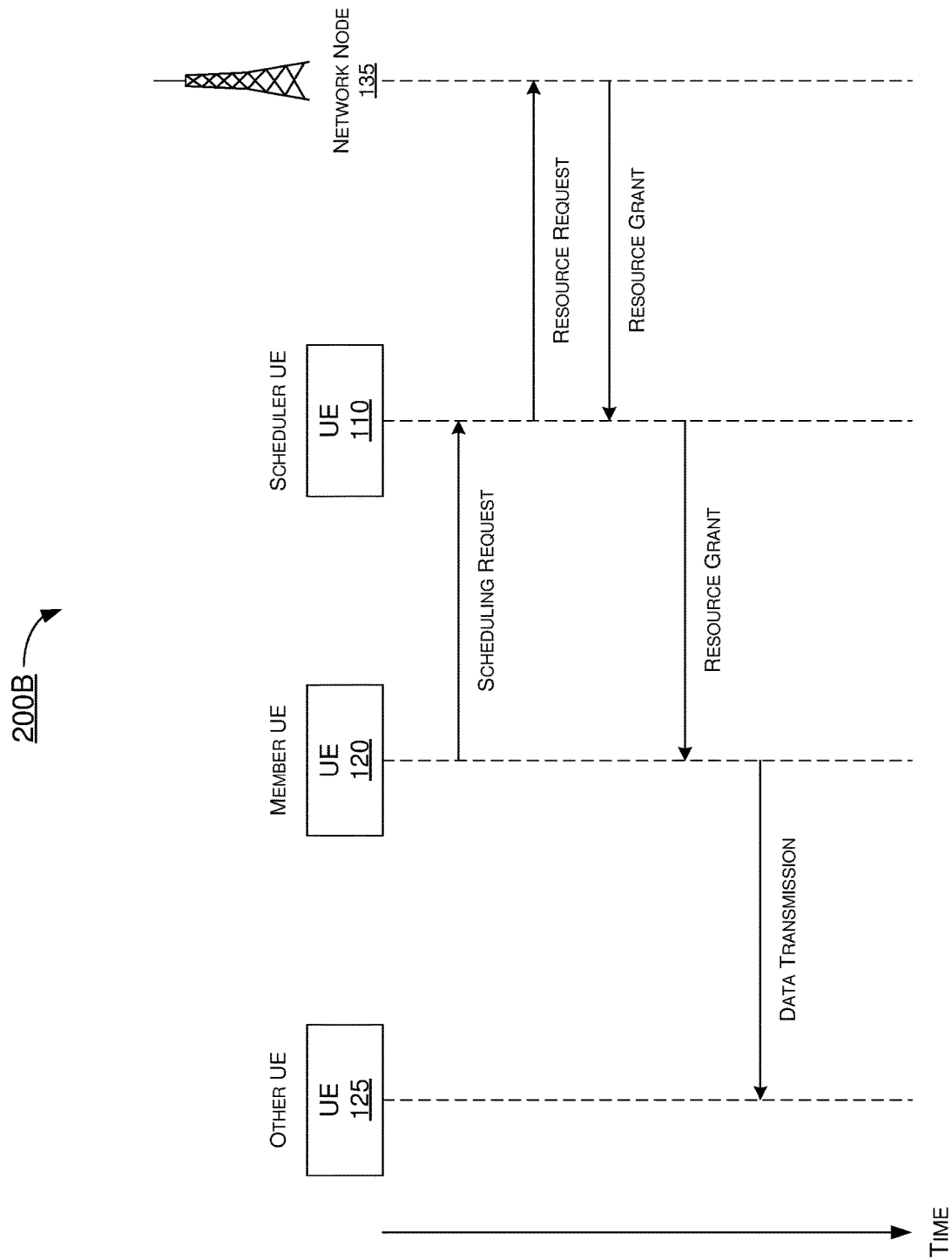
FIG. 2B is a diagram of an example scenario in accordance with an implementation of the present disclosure.

FIG. 1 illustrates an example network environment 100 in which various solutions and schemes in accordance with the present disclosure may be implemented. FIG. 2A, FIG. 2B and FIG. 3 illustrate example scenarios 200A, 200B and 300, respectively, in accordance with implementations of the present disclosure. Each of scenarios 200 and 300 may be implemented in network environment 100. The following description of various proposed schemes is provided with reference to FIG. 1~FIG. 3.

Referring to FIG. 1, network environment 100 may involve a UE 110, as a scheduler UE, in wireless communication with a wireless network 130 via a base station or network node 135 (e.g., an eNB, gNB or transmit/receive point (TRP)). Moreover, UE 110 may also be in wireless communication via a sidelink interface with one or more members, represented by UE 120, in an NR V2X cluster. UE 120 may be also in wireless communication with one or more other UEs, represented by UE 125, which may or may not be member(s) of the cluster. It is noteworthy that, although FIG. 2 shows a given number of member UEs, the number of member UEs may be different (e.g., more than one) in actual implementations of various proposed schemes of the present disclosure. In network environment 100, UE 110 and at least one of the one or more member UEs (e.g., UE 120) may implement various schemes pertaining to NR V2X cluster management in accordance with the present disclosure, as described below.

In NR V2X, platooning is one important use case. Platoon lead in a platoon may communicate with platoon members using unicast and/or multicast. For reference, in LTE V2X, distributed scheduling is used for resource allocation in mode 4. In a low or medium traffic load condition, distributed scheduling may have good performance with low collision probability. However, distributed scheduling tends to have worse performance than centralized scheduling when the traffic load for a local area is high. Thus, a cluster can be formed while the traffic load is high and, in the cluster, a scheduler UE can help schedule resources to avoid high probability of collision.

Under a proposed scheme with respect to NR V2X cluster architecture in accordance with the present disclosure, resource scheduling by UE 110 may take either of two forms, depending on the level of involvement of network node 135. In a first form, UE 110 may request from network node 135 for resources to be used for scheduling and, in response, UE 110 may receive a grant of resources from network node 135 via an Uu interface. In a second form, UE 110 may utilize resources preconfigured by network node 135 for scheduling. In either form, UE 110 may be responsible for communicating resource allocation via a sidelink interface to UE 120 which requires the resources for transmission. In partial-coverage cases, UE 110 may be expected to be in cellular coverage of network node 135 while UE 120 may be outside the cellular coverage of network node 135. In such cases, UE 120 (and UE 125) may be allocated resource(s) and utilize the allocated resource(s) for control/data transmission via sidelink interface. Under the proposed scheme, whether a given UE can serve or otherwise function as a scheduler UE (e.g., UE 110) may depend on its capability.

Referring to FIG. 2A, under a proposed scheme with respect to resource scheduling in accordance with the present disclosure, UE 110 may transmit a resource request to network node 135 and, in turn, network node 135 may grant resources for use by UE 110. Then, UE 120 may transmit to UE 110 a scheduling request with a buffer status report (BSR). In response, UE 110 may grant resource(s) to UE 120. Accordingly, UE 120 may utilize the granted resource(s) for control/data transmission to UE 125.

Referring to FIG. 2B, under a proposed scheme with respect to resource scheduling in accordance with the present disclosure, UE 120 may transmit to UE 110 a scheduling request with a (BSR. Then, UE 110 may transmit a resource request to network node 135 and, in turn, network node 135 may grant resources for use by UE 110. In response, UE 110 may grant the resource(s) to UE 120. Accordingly, UE 120 may utilize the granted resource(s) for control/data transmission to UE 125.

Referring to FIG. 3, under another proposed scheme with respect to resource scheduling in accordance with the present disclosure, network node 135 may preconfigure resources for UE 110 to utilize for resource scheduling. UE 120 may transmit a scheduling request to UE 110 with a BSR. In response, UE 110 may grant resource(s) to UE 120. Accordingly, UE 120 may utilize the granted resource(s) for control/data transmission to UE 125.

Under a proposed scheme with respect to selection of scheduler UE in accordance with the present disclosure, a UE (e.g., UE 120 or UE 125) may perform one or more operations in the process of selecting a scheduler UE. For instance, this UE may measure a channel occupancy ratio in its surrounding in network environment 100 to determine whether the channel occupancy ratio is greater than a predefined threshold. Alternatively, or additionally, this UE may determine whether it has a high throughput or whether there is a need to transmit large-sized packet(s). Upon a positive outcome of the determination (e.g., the channel occupancy ratio being greater than the predefined threshold, this UE having a high throughput and/or this UE needing to transmit large-sized packet(s)), the UE may detect existence of any scheduler UE.

In an event that multiple scheduler UEs are detected, the UE (e.g., UE 120) may select one of the multiple scheduler UEs with the largest reference signal received power (RSRP) or, alternatively, the UE may randomly select one of the multiple scheduler UEs. Upon selection of one of the multiple scheduler UEs, this UE may transmit a scheduling request with BSR to the selected scheduler UE (e.g., UE 110) to request for resources. The selected scheduler UE, upon receiving the scheduling request, may request for resources from network node 135. After receiving a grant from network node 135, or having resources preconfigured by network node 135, the selected scheduler UE may grant resource(s) to the requesting UE. Accordingly, this UE (e.g., UE 120) may utilize the granted resource(s) to transmit data.

In an event that there is only one scheduler UE detected (e.g., UE 110), the UE (e.g., UE 120) may transmit a scheduling request with BSR to the scheduler UE to request for resources. The scheduler UE, upon receiving the scheduling request, may request for resources from network node 135. After receiving a grant from network node 135, or having resources preconfigured by network node 135, the scheduler UE may grant resource(s) to the requesting UE. Accordingly, this UE (e.g., UE 120) may utilize the granted resource(s) to transmit data.

In an event that no scheduler UE is detected, the UE (e.g., UE 110 or UE 120) may determine whether itself has sufficient capability to become, serve or otherwise function as a scheduler UE. In an event that the UE has the capability to be a scheduler UE, the UE may randomly select a cluster identity (ID). In case that this UE is in cellular coverage of network node 135, this UE may transmit information to network node 135 to request to be a scheduler UE. In an event that network node 135 grants the request, this UE may thus be promoted to the status of a scheduler UE. Additionally, when granting the request, network node 135 may assign a cluster ID to this new scheduler UE. Otherwise, in case that network node 135 does not grant the request or the UE does not receive the grant from network node 135, this UE may continue to operate in its current transmission mode. In an event that the UE has the capability to be a scheduler UE but is out of the cellular coverage of network node 135, the UE may assume the status of a scheduler UE and proceed to function as a scheduler UE. For instance, this new scheduler UE may randomly select a cluster ID and broadcast the cluster ID (and any related information). Moreover, this new scheduler UE may utilize any preconfigured resource(s) for resource scheduling. However, in an event that the UE does not have the capability to be a scheduler UE, the UE may continue to operate in its current transmission mode.

Under a proposed scheme with respect to member UE check-in in accordance with the present disclosure, a cluster head (e.g., UE 110) may periodically broadcast a discovery signal with cluster information to inform other UEs the existence of a cluster associated with the cluster head. To join the cluster, a UE (e.g., UE 120 or UE 125) may report a percentage (e.g., X %) of its currently occupied communication resource to the cluster head which is the cluster head of the cluster. The cluster head, as the scheduler UE, may have full control of the reported communication resources from its members in the cluster. After check-in, a member UE (e.g., UE 120) cannot perform resource selection on communication resources shared with the cluster as usage of shared communication resources is controlled and allocated by cluster head.

Under a proposed scheme with respect to member UE check-out in accordance with the present disclosure, a UE (e.g., UE 120) may transmit a check-out signal to inform the cluster head (e.g., UE 110) that it will leave the cluster. This UE may take (e.g., be allocated and then use) some communication resource(s) before leaving the cluster. Under the proposed scheme, a UE may be deemed to have passively checked out in case that such a UE does not send a scheduling request or cannot be reached after a predetermined period. In such cases, the cluster head (e.g., UE 110) may assume or otherwise determine that the UE has checked out.

Under a proposed scheme with respect to cluster head handover to a member UE in accordance with the present disclosure, a current scheduler UE (e.g., UE 110) may choose a cluster member (e.g., UE 120) to take over the role of the next scheduler UE when the current scheduler UE detects that the RSRP of a certain percentage (e.g., X %) of cluster members of the cluster is below a predefined threshold. Under the proposed scheme, the next scheduler UE may be chosen based on one or more of the following parameters: receiving RSRP, location, speed of movement, and processing capability.

Under a proposed scheme with respect to member UE handover to another cluster in accordance with the present disclosure, a member UE (e.g., UE 120) may decide whether to join and be handed over to another cluster when the UE detects another cluster other than the one that the UE currently belongs. The UE may decide whether to join this other cluster based on information such as, for example and without limitation, RSRP, location and speed of the cluster head of the other cluster. In an event that the UE decides to join the other cluster, the UE may perform a number of operations for handover to that other cluster, as described below. Firstly, the UE may start a timer. Secondly, the UE may transmit a leaving command to its current scheduler UE and follow the check-out procedure described above to leave the current cluster. Thirdly, the UE may transmit a joining command to the scheduler UE of the other cluster and follow the check-in procedure described above to join that other cluster. In case that the UE receives a grant of leaving command or satisfies one or more leaving conditions, the UE may join the new cluster in response to the UE having received a grant of joining command. Otherwise, in case that the timer has expired, the UE may return to its original transmission mode. In an event that the UE decides not to join the other cluster or in case that the UE does not receive a grant of leaving command, the UE may keep its connection with the current scheduler UE of the current cluster.

Under a proposed scheme with respect to how to handle disappearance of the scheduler UE in accordance with the present disclosure, a member UE (e.g., UE 120) may set a timer and then listen to the scheduler UE in response to the member UE not having received any signal from the scheduler UE. In case the UE receives signal(s) from the scheduler UE, the UE may consider itself still a member of the cluster associated with the scheduler UE. Otherwise, in case that the UE does not receive any signal from the scheduler UE and the timer has expired, the UE may leave the cluster. In case that the UE does not receive any signal from the scheduler UE and the timer has not expired, the UE may consider itself still a member of the cluster associated with the scheduler UE.

Under a proposed scheme with respect to cluster dissolution in accordance with the present disclosure, a scheduler UE (e.g., UE 110) may transmit a dissolution signal to inform member UEs of the cluster that the cluster is dissolved upon the scheduler UE determining to dissolve the cluster. Under the proposed scheme, the scheduler UE may determine to dissolve the cluster as a result of the scheduler UE detecting that its channel busy ratio is lower than a predefined threshold or as a result of the scheduler UE not being able to find a suitable member to take over the role of scheduler UE. Under the proposed scheme, the scheduler UE may perform a final resource allocation before the dissolution.

Illustrative Implementations

Figure 4:
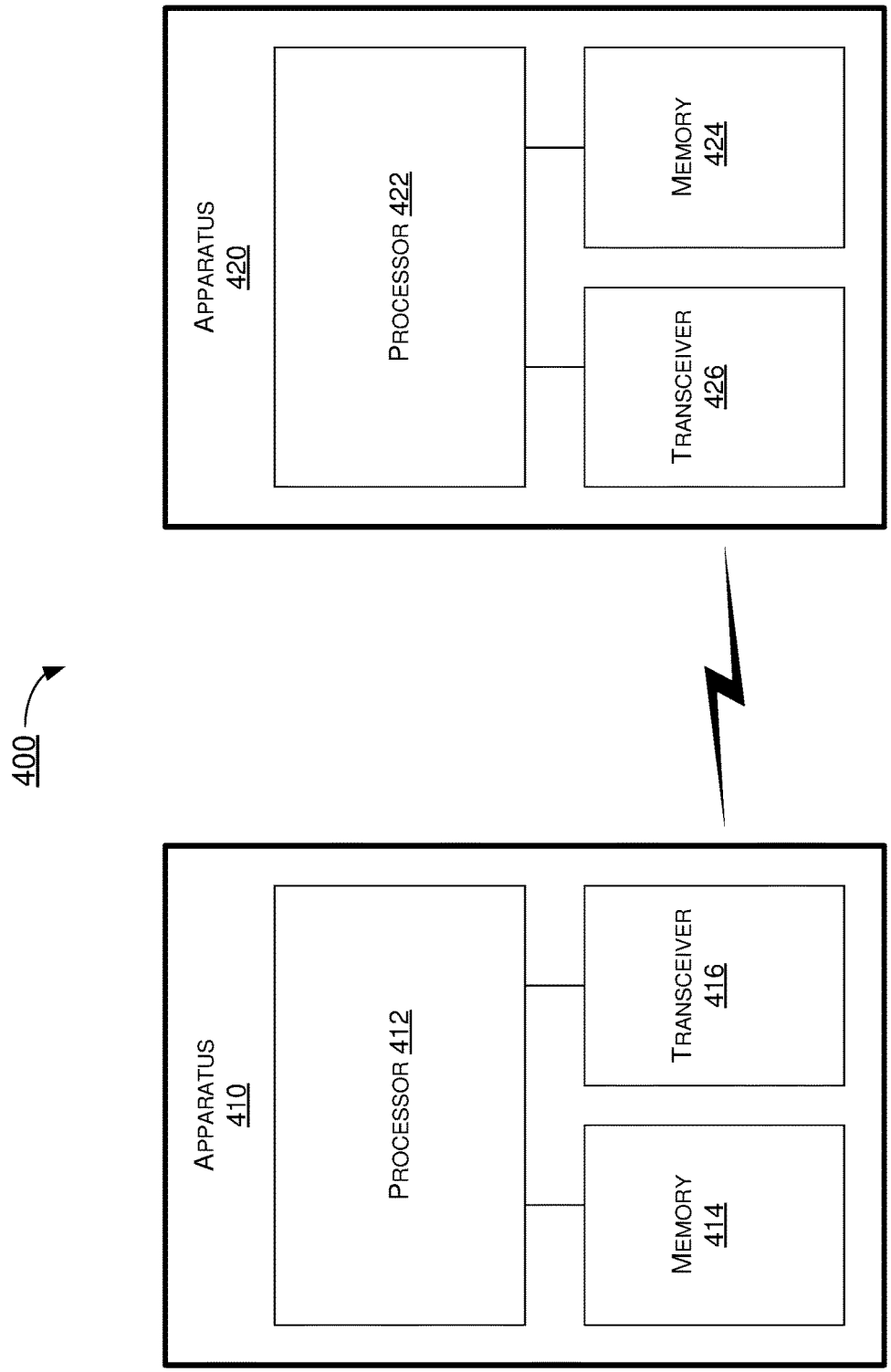
FIG. 4 is a block diagram of an example communication system in accordance with an implementation of the present disclosure.

FIG. 4 illustrates an example communication system 400 having an example apparatus 410 and an example apparatus 420 in accordance with an implementation of the present disclosure. Each of apparatus 410 and apparatus 420 may perform various functions to implement schemes, techniques, processes and methods described herein pertaining to NR V2X cluster management, including various schemes described above as well as processes described below.

Each of apparatus 410 and apparatus 420 may be a part of an electronic apparatus, which may be a UE such as a vehicle, a portable or mobile apparatus, a wearable apparatus, a wireless communication apparatus or a computing apparatus. For instance, each of apparatus 410 and apparatus 420 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 410 and apparatus 420 may also be a part of a machine type apparatus, which may be an IoT or NB-IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. Alternatively, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 410 and apparatus 420 may include at least some of those components shown in FIG. 4 such as a processor 412 and a processor 422, respectively. Each of apparatus 410 and apparatus 420 may further include one or more other components not pertinent to the proposed scheme of the present disclosure (e.g., internal power supply, display device and/or user interface device), and, thus, such component(s) of each of apparatus 410 and apparatus 420 are neither shown in FIG. 4 nor described below in the interest of simplicity and brevity.

In some implementations, at least one of apparatus 410 and apparatus 420 may be a part of an electronic apparatus, which may be a vehicle, a roadside unit (RSU), network node or base station (e.g., eNB, gNB or TRP), a small cell, a router or a gateway. For instance, at least one of apparatus 410 and apparatus 420 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 410 and apparatus 420 may be implemented in the form of one or more IC chips such as, for example and without limitation, one or more single-core processors, one or more multi-core processors, or one or more CISC or RISC processors.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including NR V2X cluster management in accordance with various implementations of the present disclosure.

In some implementations, apparatus 410 may also include a transceiver 416, as a communication device, coupled to processor 412 and capable of wirelessly transmitting and receiving data. In some implementations, apparatus 410 may further include a memory 414 coupled to processor 412 and capable of being accessed by processor 412 and storing data therein. In some implementations, apparatus 420 may also include a transceiver 426, as a communication device, coupled to processor 422 and capable of wirelessly transmitting and receiving data. In some implementations, apparatus 420 may further include a memory 424 coupled to processor 422 and capable of being accessed by processor 422 and storing data therein. Accordingly, apparatus 410 and apparatus 420 may wirelessly communicate with each other via transceiver 416 and transceiver 426, respectively.

To aid better understanding, the following description of the operations, functionalities and capabilities of each of apparatus 410 and apparatus 420 is provided in the context of an NR V2X communication environment in which apparatus 410 is implemented in or as a wireless communication device, a communication apparatus or a scheduler UE (e.g., UE 110) and apparatus 420 is implemented in or as a member UE (e.g., UE 120).

In one aspect of NR V2X cluster management in accordance with the present disclosure, processor 412 of apparatus 410, implemented in a UE (e.g., UE 110) of a V2X cluster in an NR V2X communication environment (e.g., communication environment 100), may receive, via transceiver 416, a scheduling request (e.g., with or without a BSR) from a member of the V2X cluster. Additionally, processor 412 may transmit, via transceiver 416, a resource grant to the member to allocate a resource of one or more resources to the member in response to the receiving of the scheduling request. In some implementations, the one or more resources may be either: (a) preconfigured by a wireless network, or (b) granted by the wireless network in response to apparatus 410 transmitting a resource request to the wireless network upon receiving the scheduling request.

In some implementations, processor 412 may perform additional operations. For instance, processor 412 may broadcast, via transceiver 416, a discovery signal with cluster information as notification of existence of the V2X cluster. Moreover, processor 412 may receive, via transceiver 416, a report of a percentage of resources currently occupied for communication from one other UE in response to the broadcasting of the discovery signal. Furthermore, processor 412 may determine the other UE to be a new member of the V2X cluster in response to the receiving of the report.

In some implementations, processor 412 may perform additional operations. For instance, processor 412 may receive, via transceiver 416, a check-out signal from the member. Moreover, processor 412 may determine the member to be checked out of the V2X cluster in response to the receiving of the check-out signal.

In some implementations, processor 412 may perform additional operations. For instance, processor 412 may determine the member to be checked out of the V2X cluster in response to at least one of the following: (1) a first predetermined duration having passed without receiving any further scheduling request from the member; and (2) the member being not reachable for a second predetermined duration.

In some implementations, processor 412 may perform additional operations. For instance, processor 412 may detect, via transceiver 416, that a RSRP of a predetermined percentile of a plurality of members of the V2X cluster is below a predefined threshold. Furthermore, processor 412 may select one of the plurality of members to take over a role of a scheduler UE in response to the detecting. In some implementations, in selecting one of the plurality of members, processor 412 may select one of the plurality of members based on one or more of a plurality of parameters with respect to each of the plurality of members, with the plurality of parameters including: (a) a level of a receiving RSRP; (b) a location; (c) a velocity; and (d) a processing capability. In some implementations, processor 412 may perform further operations. For instance, processor 412 may transmit, via transceiver 416, a dissolution signal to inform each member of the V2X cluster that the V2X cluster is dissolved in response to a predetermined duration having passed without finding a suitable member of the V2X cluster to take over the role as the scheduler UE. Moreover, processor 412 may optionally perform another resource allocation to one or more of the plurality of members before dissolution.

In some implementations, processor 412 may perform additional operations. For instance, processor 412 may detect, via transceiver 416, existence of a predefined condition. Moreover, processor 412 may transmit, via transceiver 416, a dissolution signal to inform each member of the V2X cluster that the V2X cluster is dissolved in response to the detecting. Furthermore, processor 412 may optionally perform another resource allocation to one or more of a plurality of members of the V2X cluster before dissolution. In some implementations, the predefined condition may include at least one of: (1) a channel busy radio of apparatus 410 being lower than a predefined threshold; and (2) a predetermined duration having passed without finding a suitable member of the V2X cluster to take over a role as a scheduler UE.

In some implementations, prior to the receiving of the scheduling request and transmitting of the resource grant, processor 412 may determine that apparatus 410 has capability to function as a scheduler UE. In some implementations, in response to determining that apparatus 410 has capability to function as the scheduler UE, processor 412 may perform additional operations. For instance, processor 412 may transmit, via transceiver 416, a request to a network node of a wireless network to request to function as the scheduler UE. Furthermore, processor 412 may obtain a cluster ID for a V2X cluster associated with the scheduler UE by either: (a) selecting a first ID to be used as the cluster ID for the V2X cluster; or (b) receiving, via transceiver 416, a message from the network node granting the request, the message indicating a second ID to be used as the cluster ID for the V2X cluster.

In one aspect of NR V2X cluster management in accordance with the present disclosure, processor 422 of apparatus 420, implemented in a UE (e.g., UE 120), may measure, via transceiver 426, a channel occupancy ratio in an NR V2X communication environment. Moreover, processor 422 may select a scheduler UE to join a V2X cluster associated with the scheduler UE based on a result of the measuring or one or more other factors. In some implementations, in selecting the scheduler UE to join the V2X cluster associated with the scheduler UE based on the result of the measuring or one or more other factors, processor 422 may select the scheduler UE in response to at least one of: (1) the measured channel occupancy ratio being greater than a predefined threshold; (2) apparatus 420 having a throughput greater than a predefined throughput; and (3) apparatus 420 having data (e.g., one or more packets) to transmit with a size of the data being greater than a predefined size. Alternatively, processor 422 of apparatus 420, implemented in a UE (e.g., UE 120), may detect, via transceiver 426, a scheduler UE (e.g., apparatus 410) in an NR V2X communication environment. Moreover, processor 422 may select the scheduler UE to join a V2X cluster associated with the scheduler UE response to the detecting and at least one of: (1) a channel occupancy ratio in the NR V2X communication environment being greater than a predefined threshold; (2) apparatus 420 having a throughput greater than a predefined throughput; and (3) apparatus 420 having data to transmit with a size of the data being greater than a predefined size.

In some implementations, in selecting the scheduler UE, processor 422 may perform certain operations. For instance, processor 422 may measure a respective RSRP of each of a plurality of scheduler UEs. Moreover, processor 422 may select the scheduler UE by performing either: (a) selecting one of the plurality of scheduler UEs having a largest RSRP compared to that of others of the plurality of scheduler UEs to be the scheduler UE; or (b) randomly selecting one of the plurality of scheduler UEs to be the scheduler UE.

In some implementations, processor 422 may perform additional operations. For instance, processor 422 may transmit, via transceiver 426, a scheduling request with a BSR to the scheduler UE. Moreover, processor 422 may receive, via transceiver 426, a resource grant from the scheduler UE that allocates a resource of one or more resources to apparatus 420 in response to the transmitting of the scheduling request. Furthermore, processor 422 may transmit, via transceiver 426, data using the allocated resource.

In some implementations, processor 422 may perform additional operations. For instance, processor 422 may determine that apparatus 420 has capability to function as a new scheduler UE. In some implementations, in an event that apparatus 420 is in cellular coverage of a network node of a wireless network, processor 422 may perform certain operations. For instance, processor 422 may transmit, via transceiver 426, a request to the network node to request to function as the new scheduler UE. In an event that the network node grants the request, processor 422 may receive, via transceiver 426, a message from the network node granting the request and obtaining a cluster identity (ID) for a V2X cluster associated with the scheduler UE by either: (a) selecting a first ID to be used as the cluster ID for the V2X cluster; or (b) receiving a message from the network node granting the request, the message indicating a second ID to be used as the cluster ID for the V2X cluster. In an event that the network node does not grant the request or that no grant is received from the network node, processor 422 may maintain in a current transmission mode.

In some implementations, in an event that apparatus 420 is out of cellular coverage of a network node of a wireless network, processor 422 may perform additional operations. For instance, processor 422 may broadcast, via transceiver 426, a discovery signal with cluster information as notification of existence of the new V2X cluster. Moreover, processor 422 may allocate a resource to a member of the new V2X cluster.

In some implementations, processor 422 may perform additional operations. For instance, processor 422 may detect, via transceiver 426, one other scheduler UE of one other V2X cluster. Moreover, processor 422 may determine whether to join the other V2X cluster in response to the detecting. Furthermore, processor 422 may perform, via transceiver 426, a handover procedure to join the other V2X cluster in response to determining to join the other V2X cluster. In some implementations, the handover procedure may involve processor 422 performing certain operations, including: (a) starting a timer; (b) transmitting a departure signal to the scheduler UE to notify the scheduler UE about departure from the V2X cluster; (c) transmitting a joining signal to the other scheduler UE to join the other V2X cluster; (d) in response to receiving a grant from the scheduler UE with respect to the departure, performing either: (i) joining the other V2X cluster in an event a grant to join the other V2X cluster is received from the other scheduler UE before expiration of the timer; or (ii) returning to an original transmission mode in an event that no grant to join the other V2X cluster is received from the other scheduler UE before expiration of the timer; and (e) in response to not receiving the grant from the scheduler UE with respect to the departure, maintaining a connection with the scheduler UE.

In some implementations, processor 422 may perform additional operations. For instance, processor 422 may start a timer. Additionally, processor 422 may determine whether any signal is received from the scheduler UE before expiration of the timer. Moreover, processor 422 may perform one of: (a) determining that apparatus 420 is still a member of the V2X cluster in an event that at least one signal is received from the scheduler UE before the expiration of the timer; (b) determining that apparatus 420 is no longer a member of the V2X cluster in an event that no signal is received from the scheduler UE before the expiration of the timer; and (c) determining that apparatus 420 is still a member of the V2X cluster in an event that no signal is received from the scheduler UE before the expiration of the timer.

Illustrative Processes

FIG. 5 illustrates an example process 500 in accordance with an implementation of the present disclosure. Process 500 may be an example implementation of the proposed schemes described above with respect to NR V2X cluster management in accordance with the present disclosure. Process 500 may represent an aspect of implementation of features of apparatus 410 and apparatus 420. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may be executed in the order shown in FIG. 5 or, alternatively, in a different order. Process 500 may also be repeated partially or entirely. Process 500 may be implemented by apparatus 410, apparatus 420 and/or any suitable wireless communication device, UE, roadside unit (RSU), base station or machine type devices. Solely for illustrative purposes and without limitation, process 500 is described below in the context of apparatus 410 as a scheduler UE (e.g., UE 110) and apparatus 420 as a member UE (e.g., UE 120) in network environment 100. Process 500 may begin at block 510.

At 510, process 500 may involve processor 412 of apparatus 410, implemented in a UE (e.g., UE 110) of a V2X cluster in an NR V2X communication environment (e.g., communication environment 100), receiving, via transceiver 416, a scheduling request (e.g., with or without a BSR) from a member of the V2X cluster. Process 500 may proceed from 510 to 520.

At 520, process 500 may involve processor 412 transmitting, via transceiver 416, a resource grant to the member to allocate a resource of one or more resources to the member in response to the receiving of the scheduling request. In some implementations, the one or more resources may be either: (a) preconfigured by a wireless network, or (b) granted by the wireless network in response to apparatus 410 transmitting a resource request to the wireless network upon receiving the scheduling request.

In some implementations, process 500 may involve processor 412 performing additional operations. For instance, process 500 may involve processor 412 broadcasting, via transceiver 416, a discovery signal with cluster information as notification of existence of the V2X cluster. Moreover, process 500 may involve processor 412 receiving, via transceiver 416, a report of a percentage of resources currently occupied for communication from one other UE in response to the broadcasting of the discovery signal. Furthermore, process 500 may involve processor 412 determining the other UE to be a new member of the V2X cluster in response to the receiving of the report.

In some implementations, process 500 may involve processor 412 performing additional operations. For instance, process 500 may involve processor 412 receiving, via transceiver 416, a check-out signal from the member. Moreover, process 500 may involve processor 412 determining the member to be checked out of the V2X cluster in response to the receiving of the check-out signal.

In some implementations, process 500 may involve processor 412 performing additional operations. For instance, process 500 may involve processor 412 determining the member to be checked out of the V2X cluster in response to at least one of the following: (1) a first predetermined duration having passed without receiving any further scheduling request from the member; and (2) the member being not reachable for a second predetermined duration.

In some implementations, process 500 may involve processor 412 performing additional operations. For instance, process 500 may involve processor 412 detecting, via transceiver 416, that a RSRP of a predetermined percentile of a plurality of members of the V2X cluster is below a predefined threshold. Furthermore, process 500 may involve processor 412 selecting one of the plurality of members to take over a role of a scheduler UE in response to the detecting. In some implementations, in selecting one of the plurality of members, process 500 may involve processor 412 selecting one of the plurality of members based on one or more of a plurality of parameters with respect to each of the plurality of members, with the plurality of parameters including: (a) a level of a receiving RSRP; (b) a location; (c) a velocity; and (d) a processing capability. In some implementations, process 500 may involve processor 412 performing further operations. For instance, process 500 may involve processor 412 transmitting, via transceiver 416, a dissolution signal to inform each member of the V2X cluster that the V2X cluster is dissolved in response to a predetermined duration having passed without finding a suitable member of the V2X cluster to take over the role as the scheduler UE. Moreover, process 500 may involve processor 412 optionally performing another resource allocation to one or more of the plurality of members before dissolution.

In some implementations, process 500 may involve processor 412 performing additional operations. For instance, process 500 may involve processor 412 detecting, via transceiver 416, existence of a predefined condition. Moreover, process 500 may involve processor 412 transmitting, via transceiver 416, a dissolution signal to inform each member of the V2X cluster that the V2X cluster is dissolved in response to the detecting. Furthermore, process 500 may involve processor 412 optionally performing another resource allocation to one or more of a plurality of members of the V2X cluster before dissolution. In some implementations, the predefined condition may include at least one of: (1) a channel busy radio of apparatus 410 being lower than a predefined threshold; and (2) a predetermined duration having passed without finding a suitable member of the V2X cluster to take over a role as a scheduler UE.

In some implementations, prior to the receiving of the scheduling request and transmitting of the resource grant, process 500 may involve processor 412 determining that apparatus 410 has capability to function as a scheduler UE. In some implementations, in response to determining that apparatus 410 has capability to function as the scheduler UE, process 500 may involve processor 412 performing additional operations. For instance, process 500 may involve processor 412 transmitting, via transceiver 416, a request to a network node of a wireless network to request to function as the scheduler UE. Furthermore, process 500 may involve processor 412 obtaining a cluster ID for a V2X cluster associated with the scheduler UE by either: (a) selecting a first ID to be used as the cluster ID for the V2X cluster; or (b) receiving, via transceiver 416, a message from the network node granting the request, the message indicating a second ID to be used as the cluster ID for the V2X cluster.

Figure 6:
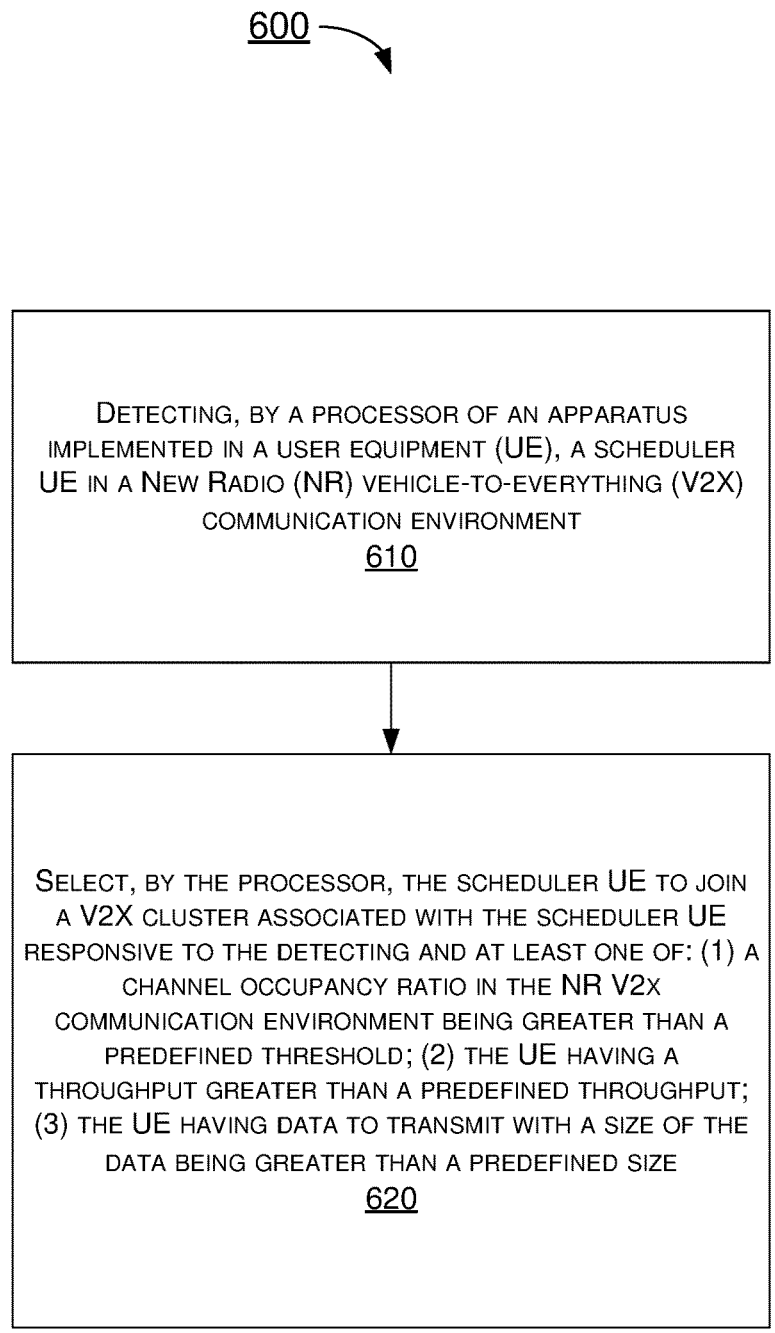
FIG. 6 is a flowchart of an example process in accordance with an implementation of the present disclosure.

FIG. 6 illustrates an example process 600 in accordance with an implementation of the present disclosure. Process 600 may be an example implementation of the proposed schemes described above with respect to NR V2X cluster management in accordance with the present disclosure. Process 600 may represent an aspect of implementation of features of apparatus 410 and apparatus 420. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may be executed in the order shown in FIG. 6 or, alternatively, in a different order. Process 600 may also be repeated partially or entirely. Process 600 may be implemented by apparatus 410, apparatus 420 and/or any suitable wireless communication device, UE, roadside unit (RSU), base station or machine type devices. Solely for illustrative purposes and without limitation, process 600 is described below in the context of apparatus 410 as a scheduler UE (e.g., UE 110) and apparatus 420 as a member UE (e.g., UE 120) in network environment 100. Process 600 may begin at block 610.

At 610, process 600 may involve processor 422 of apparatus 420, implemented in a UE (e.g., UE 120), detecting, via transceiver 426, a scheduler UE (e.g., apparatus 410) in an NR V2X communication environment. Process 600 may proceed from 610 to 620.

At 620, process 600 may involve processor 422 selecting the scheduler UE to join a V2X cluster associated with the scheduler UE. In some implementations, in selecting the scheduler UE to join the V2X cluster associated with the scheduler UE, process 600 may involve processor 422 selecting the scheduler UE in response to the detecting and at least one of: (1) a channel occupancy ratio in the NR V2X communication environment being greater than a predefined threshold; (2) apparatus 420 having a throughput greater than a predefined throughput; and (3) apparatus 420 having data to transmit with a size of the data being greater than a predefined size.

In some implementations, in selecting the scheduler UE, process 600 may involve processor 422 performing certain operations. For instance, process 600 may involve processor 422 measuring a respective RSRP of each of a plurality of scheduler UEs. Moreover, process 600 may involve processor 422 selecting the scheduler UE by performing either: (a) selecting one of the plurality of scheduler UEs having a largest RSRP compared to that of others of the plurality of scheduler UEs to be the scheduler UE; or (b) randomly selecting one of the plurality of scheduler UEs to be the scheduler UE.

In some implementations, process 600 may involve processor 422 performing additional operations. For instance, process 600 may involve processor 422 transmitting, via transceiver 426, a scheduling request with a BSR to the scheduler UE. Moreover, process 600 may involve processor 422 receiving, via transceiver 426, a resource grant from the scheduler UE that allocates a resource of one or more resources to apparatus 420 in response to the transmitting of the scheduling request. Furthermore, process 600 may involve processor 422 transmitting, via transceiver 426, data using the allocated resource.

In some implementations, process 600 may involve processor 422 performing additional operations. For instance, process 600 may involve processor 422 determining that apparatus 420 has capability to function as a new scheduler UE. In some implementations, in an event that apparatus 420 is in cellular coverage of a network node of a wireless network, process 600 may involve processor 422 performing certain operations. For instance, process 600 may involve processor 422 transmitting, via transceiver 426, a request to the network node to request to function as the new scheduler UE. In an event that the network node grants the request, process 600 may involve processor 422 receiving, via transceiver 426, a message from the network node granting the request and obtaining a cluster identity (ID) for a V2X cluster associated with the scheduler UE by either: (a) selecting a first ID to be used as the cluster ID for the V2X cluster; or (b) receiving a message from the network node granting the request, the message indicating a second ID to be used as the cluster ID for the V2X cluster. In an event that the network node does not grant the request or that no grant is received from the network node, process 600 may involve processor 422 maintaining in a current transmission mode.

In some implementations, in an event that apparatus 420 is out of cellular coverage of a network node of a wireless network, process 600 may involve processor 422 performing additional operations. For instance, process 600 may involve processor 422 broadcasting, via transceiver 426, a discovery signal with cluster information as notification of existence of the new V2X cluster. Moreover, process 600 may involve processor 422 allocating a resource to a member of the new V2X cluster.

In some implementations, process 600 may involve processor 422 performing additional operations. For instance, process 600 may involve processor 422 detecting, via transceiver 426, one other scheduler UE of one other V2X cluster. Moreover, process 600 may involve processor 422 determining whether to join the other V2X cluster in response to the detecting. Furthermore, process 600 may involve processor 422 performing, via transceiver 426, a handover procedure to join the other V2X cluster in response to determining to join the other V2X cluster. In some implementations, the handover procedure may involve processor 422 performing certain operations, including: (a) starting a timer; (b) transmitting a departure signal to the scheduler UE to notify the scheduler UE about departure from the V2X cluster; (c) transmitting a joining signal to the other scheduler UE to join the other V2X cluster; (d) in response to receiving a grant from the scheduler UE with respect to the departure, performing either: (i) joining the other V2X cluster in an event a grant to join the other V2X cluster is received from the other scheduler UE before expiration of the timer; or (ii) returning to an original transmission mode in an event that no grant to join the other V2X cluster is received from the other scheduler UE before expiration of the timer; and (e) in response to not receiving the grant from the scheduler UE with respect to the departure, maintaining a connection with the scheduler UE.

In some implementations, process 600 may involve processor 422 performing additional operations. For instance, process 600 may involve processor 422 starting a timer. Additionally, process 600 may involve processor 422 determining whether any signal is received from the scheduler UE before expiration of the timer. Moreover, process 600 may involve processor 422 performing one of: (a) determining that apparatus 420 is still a member of the V2X cluster in an event that at least one signal is received from the scheduler UE before the expiration of the timer; (b) determining that apparatus 420 is no longer a member of the V2X cluster in an event that no signal is received from the scheduler UE before the expiration of the timer; and (c) determining that apparatus 420 is still a member of the V2X cluster in an event that no signal is received from the scheduler UE before the expiration of the timer.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
broadcasting, by a processor of an apparatus implemented in a user equipment (UE) of a vehicle-to-everything (V2X) cluster in a New Radio (NR) V2X communication environment, a discovery signal with cluster information as notification of existence of the V2X cluster;
receiving, by the processor, a report of a percentage of resources currently occupied for communication from one other UE responsive to the broadcasting of the discovery signal; and
determining, by the processor, the other UE to be a new member of the V2X cluster responsive to the receiving of the report.

2. The method of claim 1, further comprising:
receiving, by the processor, a scheduling request from a member of the V2X cluster; and
transmitting, by the processor, a resource grant to the member to allocate a resource of one or more resources to the member responsive to the receiving of the scheduling request,
wherein the one or more resources are either:
preconfigured by a wireless network, or
granted by the wireless network responsive to the UE transmitting a resource request to the wireless network upon receiving the scheduling request.

3. The method of claim 1, further comprising:
receiving, by the processor, a check-out signal from the member; and
determining, by the processor, the member to be checked out of the V2X cluster responsive to the receiving of the check-out signal.

4. The method of claim 3, further comprising:
determining, by the processor, the member to be checked out of the V2X cluster responsive to at least one of:
a first predetermined duration having passed without receiving any further scheduling request from the member; and
the member being not reachable for a second predetermined duration.

5. The method of claim 1, further comprising:
detecting, by the processor, that a reference signal received power (RSRP) of a predetermined percentile of a plurality of members of the V2X cluster is below a predefined threshold; and
selecting, by the processor, one of the plurality of members to take over a role of a scheduler UE responsive to the detecting.

6. The method of claim 5, wherein the selecting of one of the plurality of members comprises selecting one of the plurality of members based on one or more of a plurality of parameters with respect to each of the plurality of members, the plurality of parameters comprising:
a level of a receiving RSRP;
a location;
a velocity; and
a processing capability.

7. The method of claim 5, further comprising:
transmitting, by the processor, a dissolution signal to inform each member of the V2X cluster that the V2X cluster is dissolved responsive to a predetermined duration having passed without finding a suitable member of the V2X cluster to take over the role as the scheduler UE; and
optionally performing, by the processor, another resource allocation to one or more of the plurality of members before dissolution.

8. The method of claim 1, further comprising:
detecting, by the processor, existence of a predefined condition;
transmitting, by the processor, a dissolution signal to inform each member of the V2X cluster that the V2X cluster is dissolved responsive to the detecting; and
optionally performing, by the processor, another resource allocation to one or more of a plurality of members of the V2X cluster before dissolution.

9. The method of claim 8, wherein the predefined condition comprises at least one of:
a channel busy radio of the UE being lower than a predefined threshold; and
a predetermined duration having passed without finding a suitable member of the V2X cluster to take over a role as a scheduler UE.

10. The method of claim 1, further comprising:
prior to the receiving of the scheduling request and transmitting of the resource grant, determining, by the processor, that the UE has capability to function as a scheduler UE.

11. The method of claim 10, further comprising:
responsive to determining that the UE has capability to function as the scheduler UE:
transmitting, by the processor, a request to a network node of a wireless network to request to function as the scheduler UE; and
obtaining, by the processor, a cluster identity (ID) for a V2X cluster associated with the scheduler UE by either:
selecting a first ID to be used as the cluster ID for the V2X cluster; or
receiving a message from the network node granting the request, the message indicating a second ID to be used as the cluster ID for the V2X cluster.

12. A method, comprising:
detecting, by a processor of an apparatus implemented in a user equipment (UE), a scheduler UE in a New Radio (NR) vehicle-to-everything (V2X) communication environment; and
selecting, by the processor, the scheduler UE to join a V2X cluster associated with the scheduler UE responsive to the detecting and at least one of:
a channel occupancy ratio in the NR V2X communication environment being greater than a predefined threshold;
the UE having a throughput greater than a predefined throughput; and
the UE having data to transmit with a size of the data being greater than a predefined size.

13. The method of claim 12, wherein the selecting of the scheduler UE comprises:
measuring a respective reference signal received power (RSRP) of each of a plurality of scheduler UEs; and
selecting the scheduler UE by:
selecting one of the plurality of scheduler UEs having a largest RSRP compared to that of others of the plurality of scheduler UEs to be the scheduler UE; or
randomly selecting one of the plurality of scheduler UEs to be the scheduler UE.

14. The method of claim 12, further comprising:
transmitting, by the processor, a scheduling request with a buffer status report (BSR) to the scheduler UE;

receiving, by the processor, a resource grant from the scheduler UE that allocates a resource of one or more resources to the UE responsive to the transmitting of the scheduling request; and transmitting, by the UE, data using the allocated resource.

15. The method of claim 12, further comprising:

determining, by the processor, that the UE has capability to function as a new scheduler UE.

16. The method of claim 15, further comprising:

in an event that the UE is in cellular coverage of a network node of a wireless network:
  transmitting, by the processor, a request to the network node to request to function as the new scheduler UE;
  in an event that the network node grants the request:
    receiving, by the processor, a message from the network node granting the request; and
    obtaining, by the processor, a cluster identity (ID) for a V2X cluster associated with the scheduler UE by either:
      selecting a first ID to be used as the cluster ID for the V2X cluster; or
      receiving a message from the network node granting the request, the message indicating a second ID to be used as the cluster ID for the V2X cluster; and
  in an event that the network node does not grant the request or that no grant is received from the network node, maintaining, by the processor, in a current transmission mode.

17. The method of claim 15, further comprising:

in an event that the UE is out of cellular coverage of a network node of a wireless network:
  broadcasting, by the processor, a discovery signal with cluster information as notification of existence of the new V2X cluster; and
  allocating, by the processor, a resource to a member of the new V2X cluster.

18. The method of claim 12, further comprising:

detecting, by the processor, one other scheduler UE of one other V2X cluster;

determining, by the processor, whether to join the other V2X cluster responsive to the detecting; and performing, by the processor, a handover procedure to join the other V2X cluster responsive to determining to join the other V2X cluster.

19. The method of claim 18, wherein the handover procedure comprises:

starting a timer;

transmitting a departure signal to the scheduler UE to notify the scheduler UE about departure from the V2X cluster;

transmitting a joining signal to the other scheduler UE to join the other V2X cluster;

responsive to receiving a grant from the scheduler UE with respect to the departure, performing either:
  joining the other V2X cluster in an event a grant to join the other V2X cluster is received from the other scheduler UE before expiration of the timer; or
  returning to an original transmission mode in an event that no grant to join the other V2X cluster is received from the other scheduler UE before expiration of the timer; and responsive to not receiving the grant from the scheduler UE with respect to the departure, maintaining a connection with the scheduler UE.

20. The method of claim 12, further comprising:

starting, by the processor, a timer;

determining, by the processor, whether any signal is received from the scheduler UE before expiration of the timer; and performing, by the processor, one of:
  determining that the UE is still a member of the V2X cluster in an event that at least one signal is received from the scheduler UE before the expiration of the timer;
  determining that the UE is no longer a member of the V2X cluster in an event that no signal is received from the scheduler UE before the expiration of the timer; and
  determining that the UE is still a member of the V2X cluster in an event that no signal is received from the scheduler UE before the expiration of the timer.

* * * * *